United States Patent
Ciccone et al.

(10) Patent No.: US 6,891,809 B1
(45) Date of Patent: *May 10, 2005

(54) BACKGROUND COMMUNICATION USING SHADOW OF AUDIO SIGNAL

(75) Inventors: John Charles Ciccone, Scottsdale, AZ (US); Samuel L. Thomasson, Gilbert, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,374

(22) Filed: Nov. 5, 1999

(51) Int. Cl.[7] ............................................... H04B 3/20
(52) U.S. Cl. ........................................ 370/289; 379/3
(58) Field of Search ................. 370/296, 527, 370/528, 529, 493, 494, 495, 281, 286, 289, 290; 379/93.01, 93.09, 390.01, 388, 390, 411

(56) References Cited

U.S. PATENT DOCUMENTS

| 4,748,663 A | 5/1988 | Phillips et al. ............... 379/388 |
| 5,386,465 A | 1/1995 | Addeo et al. ................ 379/202 |
| 5,455,543 A | 10/1995 | Kechkaylo ................... 332/103 |
| 5,455,544 A | 10/1995 | Kechkaylo ................... 332/103 |

OTHER PUBLICATIONS

Brennan, Paul V., "Phase–Locked Loops: Principles and Practice", R.R. Donnelley & Sons Company (1996), pp. 8–9.

Primary Examiner—Frank Duong
Assistant Examiner—Melanie Jagannathan
(74) Attorney, Agent, or Firm—Paul F. Wille

(57) ABSTRACT

Data is transferred by delaying an audio signal less than fifty milliseconds to produce a shadow signal and combining the shadow signal with the audio signal. The shadow represents the data to be transferred A telephone constructed in accordance with the invention has at least two, separate machine states, each of which includes operating in half duplex mode and two, separate machine states, each of which includes operating in full duplex mode. The state is selected based upon one or more shadows detected at the line input of the telephone.

5 Claims, 8 Drawing Sheets

BACKGROUND COMMUNICATION USING SHADOW OF AUDIO SIGNAL

BACKGROUND OF THE INVENTION

This invention relates to telephone systems and, in particular, to transferring data within the voice band over a telephone line during a conversation. As used herein, a telephone "line" includes cellular telephones.

At present, there are two kinds of echo in a telephone system, an acoustic echo between an earphone or a speaker and a microphone and an electrical echo occurring in the switched network for routing a call between stations. In a handset, acoustic echo is typically not much of a problem. In speaker phones, where several people huddle around a microphone and loudspeaker, acoustic feedback is much more of a problem. Hybrid circuits (two-wire to four-wire transformers) located at terminal exchanges or in remote subscriber stages of a fixed network are the principal sources of electrical echo, also known as line echo.

An echo is perceived as an echo if the delay is greater than approximately fifty milliseconds. Acoustic echoes and line echoes typically far exceed this threshold. Between about twenty milliseconds and about fifty milliseconds, an echo can impart a certain richness to a sound, as is often done to enhance the thin voices of some recording artists.

It has been discovered that imperceptible echoes, that is, echoes having a delay less than about fifty milliseconds, can be used to transmit data in the voice band during a telephone conversation. The need for such capability has long existed. Telephones, and particularly cellular telephones, transmit considerable amounts of data prior to completing a call, i.e. prior to making a connection to the other party. Some data is transmitted after a party hangs up. The problem is that no data is transmitted during a call. The reason is obvious, no one wants a telephone beeping away in the background or the hiss of a multiplexed signal during a call.

There are many occasions when it would be desirable and extremely useful to be able to send data during a call. For example, in conference calls, one party invariably sounds louder than another and there is no way to make an adjustment during a call, except to interrupt the conversation to ask the louder party to speak more softly, which the louder party forgets to do after a few minutes.

There are many other situations that could be improved by being able to send data during a telephone call. For example, the time remaining on a pre-paid call could be sent and displayed at the payer's telephone. Data concerning routing or the quality of the line could also be exchanged.

Filtering a voice signal to eliminate echo is known in the art. Devices known as complementary comb filters have been used to eliminate echoes by having the signal to a speaker filtered through the pass bands of a first comb filter, thereby falling within the stop bands of a second, complementary comb filter coupled to a microphone. If all telephones are configured the same way, some sort of spectrum shift must take place to move undesired signals into the stop bands of a comb filter in order to eliminate both acoustic echoes and line echoes. U.S. Pat. No. 5,386,465 (Addeo et al.) discloses a frequency "scaler" for moving signals into a stop band.

The same type of comb filter can be used in each channel of a telephone if one also uses a frequency shift, see U.S. Pat. No. 4,748,663 (Phillips et al.). Frequency shifting and frequency scaling are undesirable because of their effect on the quality of the voice signal. Providing complementary filters would be simple and effective if telephones could communicate with each other during a call to select which filter to use to assure a complementary relation rather than both telephones using the same pass bands and stop bands.

In view of the foregoing, it is therefore an object of the invention to provide an apparatus and method for communicating data unobtrusively within the voice band over a telephone line during a conversation.

Another object of the invention is to communicate data, including control signals, over a telephone line during a conversation.

A further object of the invention is to provide an apparatus and method for communicating data over a telephone line simultaneously with voice signals, i.e. without multiplexing voice and data.

Another object of the invention is to provide an apparatus and method for controlling complementary comb filters during a telephone conversation.

A further object of the invention is to provide an apparatus and method for controlling a plurality of telephones in what is known as a conference call.

SUMMARY OF THE INVENTION

The foregoing objects are achieved in this invention in which data is transferred by delaying an audio signal less than fifty milliseconds to produce a shadow signal and combining the shadow signal with the audio signal. The shadow represents the data to be transferred. A telephone constructed in accordance with the invention has at least two, separate machine states, each of which includes operating in half duplex mode and two, separate machine states, each of which includes operating in full duplex mode. The state is selected based upon one or more shadows detected at the line input of the telephone.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
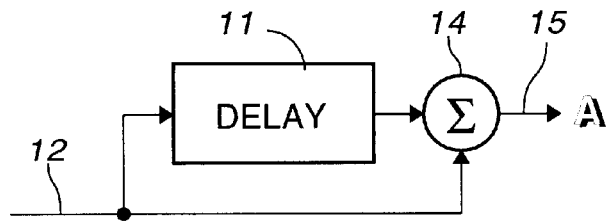
FIG. 1 is a block diagram of the basic elements of the invention.

As illustrated in FIG. 1, the invention operates by delaying a signal a small amount, less than fifty milliseconds, to produce an echo, herein called a "shadow" to distinguish it from perceptible echoes, and adding the shadow to the original signal. The signal, and the delay, can be analog or digital.

Delay circuit 11 is preferably a switched capacitor network that stores samples of the signal on input 12. The delay is produced by reading the samples a predetermined time after writing. If delay 11 has one hundred forty four storage sites, then a three millisecond delay is produced by reading one hundred thirty two sites following the write signal, at a sample frequency of 44.1 kHz. Copending application Ser. No. 09/361,014, filed Jul. 23, 1999, entitled "High Resolution Delay Line", and assigned to the assignee of this invention discloses high resolution analog and digital delay lines suitable for use in this invention.

Summation circuit 14 is preferably active, e.g. an operational amplifier, rather than passive, e.g. a resistive summing network. Output signal 15 can be filtered, digitized, converted back to analog form, etc. in a telephone switching network without losing intelligibility or the shadow. Digital information can be represented by the presence or absence of a shadow to indicate a one or a zero but it is preferred to use two shadows.

Figure 2:
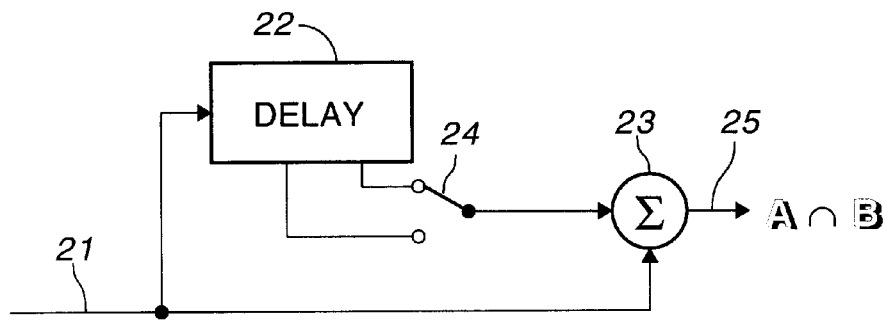
FIG. 2 is a block diagram of a system for encoding digital data with two delays.

FIG. 2 is a block diagram of a circuit for modulating an audio signal with data. Input 21 is coupled to delay 22 and to summation circuit 23. Delay 22 includes two taps, e.g. at 2.25 milliseconds and at 3.0 milliseconds. Depending upon which tap is selected, the output signal includes either shadow A or shadow B. The shadows are alternative in this example of the invention but could be simultaneous for other applications.

Tests have shown that a difference of about six percent in the amount of delay produces signals that have essentially zero correlation. Thus, each shadow can be detected even when the shadows are simultaneous and continuous. The tests also indicated that the more random the signal, the less separation necessary for zero correlation. That is, purely random signals could have shadows separated by much less than one millisecond and still be distinguished. Six percent should be understood as a rule of thumb or a guide dealing with audio signals, not as an absolute lower limit.

Figure 3:
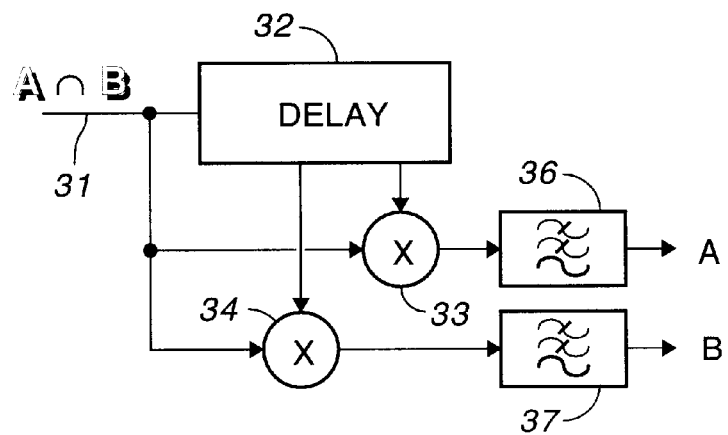
FIG. 3 is a block diagram of a system for decoding data represented by two delays.

FIG. 3 is a block diagram of a circuit for detecting two shadows, whether they be simultaneous or alternative. A signal on input 31 is coupled to delay 32, to one input of correlator 33, and to one input of correlator 34. A second input to correlator 33 is coupled to a first tap on delay 32. A second input to correlator 34 is coupled to a second tap on delay 32. The output of correlator 33 is coupled to averaging circuit or low pass filter 36. The output of correlator 34 is coupled to averaging circuit or low pass filter 37.

Correlators or multipliers, particularly in analog form, can be quite complex. A ring modulator is known in the art as an amplitude inverting multiplier circuit. Recent examples of such ring modulators are described in U.S. Pat. Nos. 5,455,543 and 5,455,544. An even simpler circuit, known in the art, is a multiplying phase detector; see Brennan, Paul V., "Phase-Locked Loops: Principles and Practice", R.R. Donnelley & Sons Company (1996), pages 8–9. A form of the latter circuit has been used in one embodiment of the invention.

Figure 4:
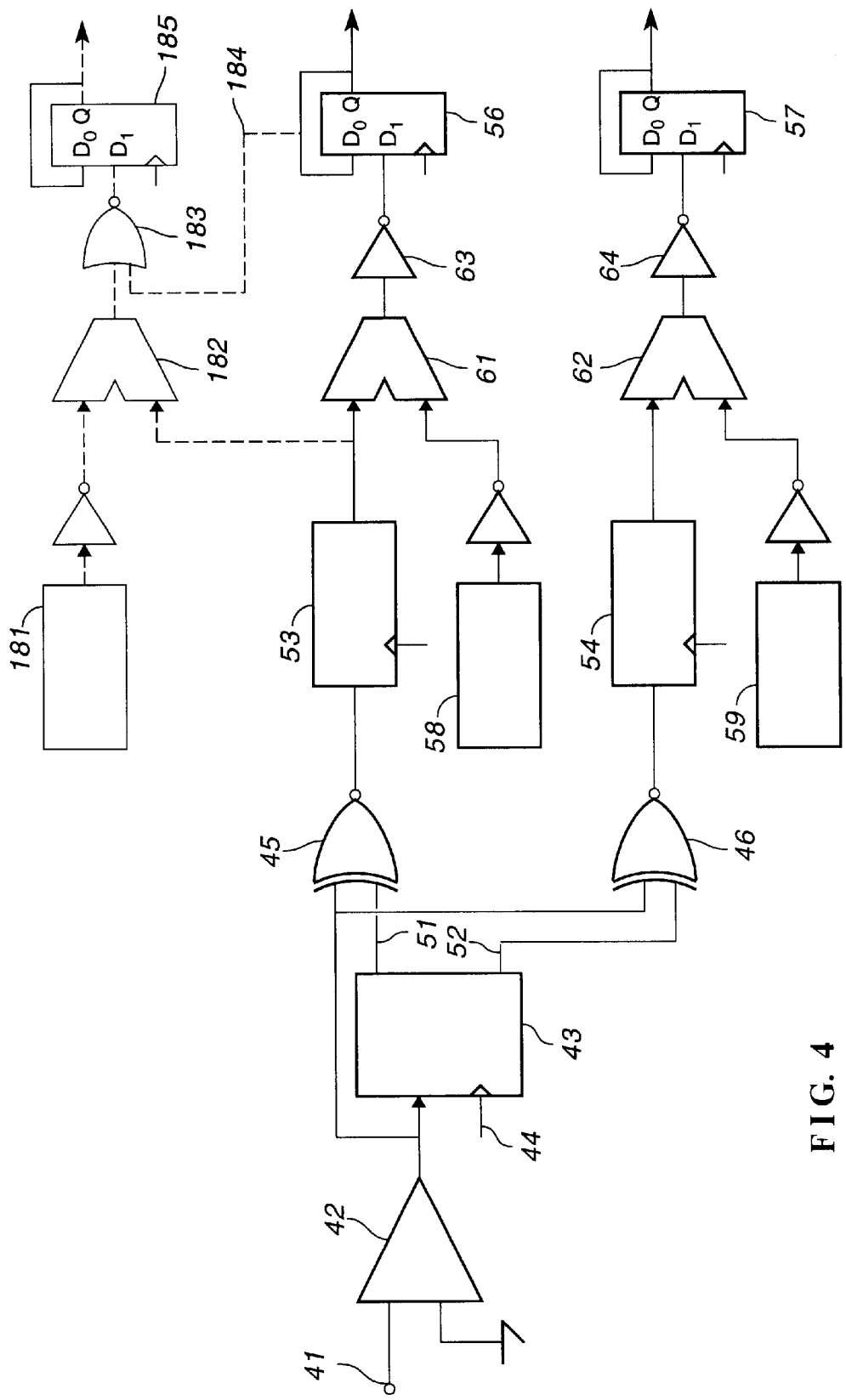
FIG. 4 is a block diagram of a decoding system constructed in accordance with a preferred embodiment of the invention.

The input signal and delay 32 can be analog or digital but digital is preferred. FIG. 4 is a digital implementation of FIG. 3 and is a preferred embodiment of the invention. FIG. 4 has the advantage of being more compact in integrated circuit form than other embodiments of the invention. For example, shift registers are much smaller delay devices than switched capacitor circuits.

Multipliers 33 and 34 (FIG. 3) essentially correlate zero crossings. Thus, the signal on input 41 is digitized by applying the signal to a first input of comparator 42 having analog ground as the reference signal coupled to a second input. The output of comparator 42 is coupled to shift register 43 and to one input of each of exclusive-NOR circuits 45 and 46. Tap 51 from shift register 43 is coupled to a second input of exclusive-NOR circuit 45. Tap 52 from shift register 43 is coupled to a second input of exclusive-NOR circuit 46. The taps correspond to delays of 2.25 milliseconds and 3.0 milliseconds; that is, the taps correspond to the delays imposed in creating the shadows. A clock signal on input 44, and on similar inputs of other devices in FIG. 4, synchronizes operation.

The output of exclusive-NOR circuit 45 is coupled to accumulator 53. The output of exclusive-NOR circuit 46 is coupled to accumulator 54. The combination of an exclusive-NOR circuit and a counter acts as a multiplier and an integrator to indicate a shadow component in the incoming signal. Each multiplication causes an output pulse to be produced and counted. A clear signal (not shown) is sent periodically to accumulators 53, 54, and to D-flip-flops 56 and 57. It is assumed that a predetermined number of pulses within a reset period, e.g. 250 pulses within 50 milliseconds, indicates a correlation between the two input signals. Other quantities could be chosen.

Registers 58 and 59 are each loaded with a predetermined count, which need not be the same for each shadow. The outputs of the registers are inverted and applied to adders 61 and 62. The counts in registers 58 and 59 are subtracted from the counts in accumulators 53 and 54. At positive difference, a negative output is produced by adder 61, the output is inverted by inverter 63 and is coupled to D-flip-flop 56. An output from D-flip-flop 56 indicates the presence of an "A" shadow. Similarly, at positive difference between the counts in counters 54 and 59, a negative output is produced by adder 62, the output is inverted by inverter 64 and coupled to D-flip-flop 57. An output from D-flip-flop 57 indicates the presence of a "B" shadow. The Q outputs of the D-flip-flops are fed back to the $D_0$ inputs to latch the output once the predetermined count is reached. The outputs remain latched until the next clear signal.

Accumulators 53 and 54 assure a reliable indication of the presence of a shadow and periodically resetting the counters assures that the system can adapt quickly to changes in condition. Although two shadows are detectable by the apparatus of FIG. 4, the apparatus can be replicated to detect any number of shadows, provided that the shadows are sufficiently separated.

Figure 5:
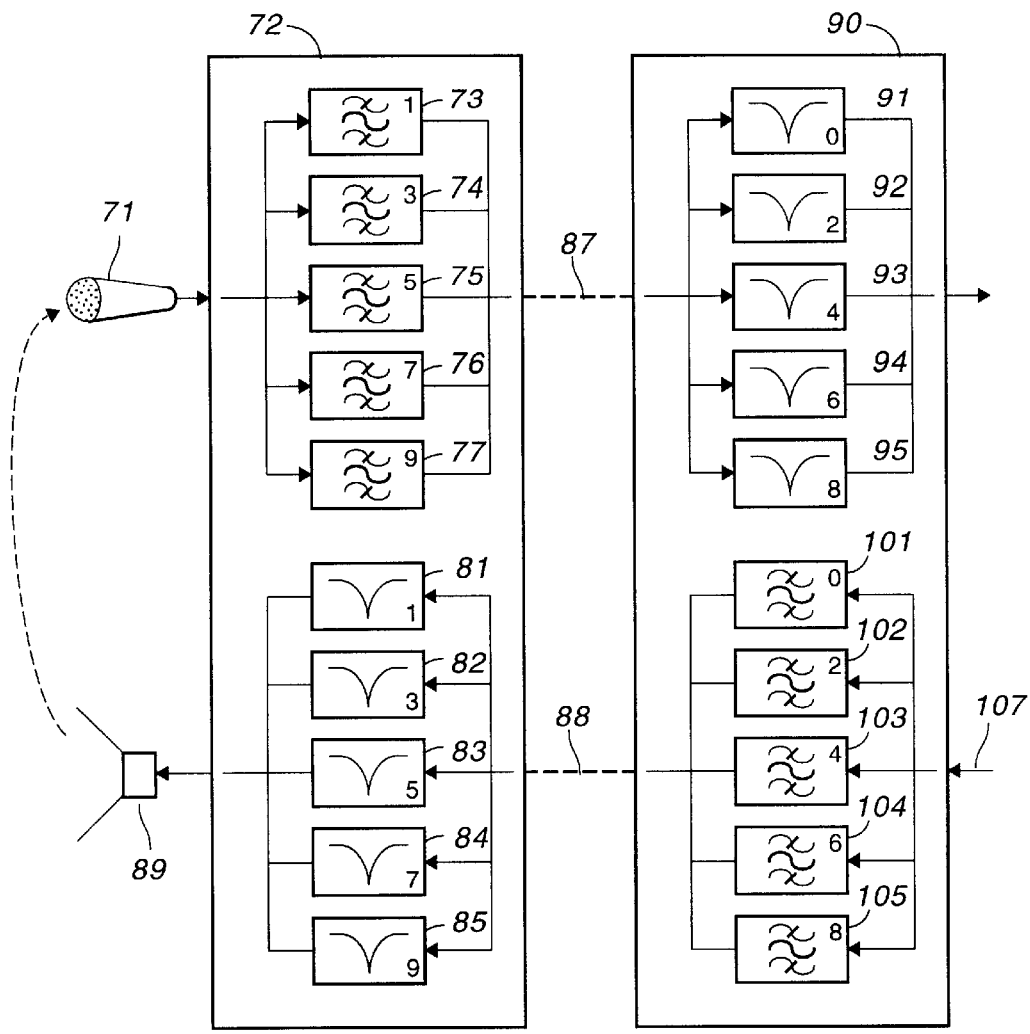
FIG. 5 is a block diagram of a telephone including a comb filter having pass band filters and notch filters.

As previously noted, the information contained in a shadow can be data or control instructions, e.g. to reduce the gain of an amplifier. Another control function is the selection of one of two groups of complementary comb filters in a telephone by detecting an "A" or a "B" delay and enabling the corresponding set of filters. FIG. 5 illustrates a telephone having complementary comb filters.

In FIG. 5, sound incident upon microphone 71 is converted into an electrical signal and coupled to telephone 72. A portion of the circuitry within telephone 72 includes band pass filters 73, 74, 75, 76, and 77. The number of filters is a matter of design. Considering that the total bandwidth of the system is only 300–3,400 Hz, five filters are a nice compromise between precision and cost. Three band pass filters are the fewest usable.

Telephone 72 also includes notch filters 81, 82, 83, 84, and 85. The center frequencies of the notch filters corresponds to the center frequencies of the band pass filters. Thus, a signal passing through the band pass filters, traveling along transmission line 87 and reflected back to transmission line 88 would be attenuated by the notch filters. A single telephone constructed in accordance with the invention provides approximately 10 dB of attenuation of a signal between microphone 71 and speaker 89.

Telephone 90 is constructed in like manner except that the center frequencies of the filters are offset from the center frequencies of the filters in telephone 72. Specifically, the center frequencies of notch filters 91, 92, 93, 94, and 95 are between the center frequencies of the band pass filters in telephone 72. Thus, the notch filters in telephone 90 are aligned with the dead bands between the band pass filters in telephone 72, which further increases the effectiveness of the circuit.

The center frequencies of the filters are preferably exponentially related. In a preferred embodiment of the invention, the center frequencies were determined from the following equation, $$f_k = 318 \times 1.3^k$$

where k=0–9, or from the following equations $$f_{odd} = 414 \times 1.3^{2k}$$

$$f_{even} = 318 \times 1.3^{2k}$$

where k=0–4. Other center frequencies or coefficients could be used instead.

Telephone 90 also includes band pass filters 101, 102, 103, 104, and 105 having the same center frequencies as the notch filters in telephone 90. Thus, a signal on input 107, e.g., from a microphone (not shown), is divided among the band pass filters, summed, and transmitted over line 88 to telephone 72. The center frequencies of the notch filters in telephone 72 correspond to the dead bands between the bands of band pass filters 101–105, enhancing the operation of these filters.

Figure 6:
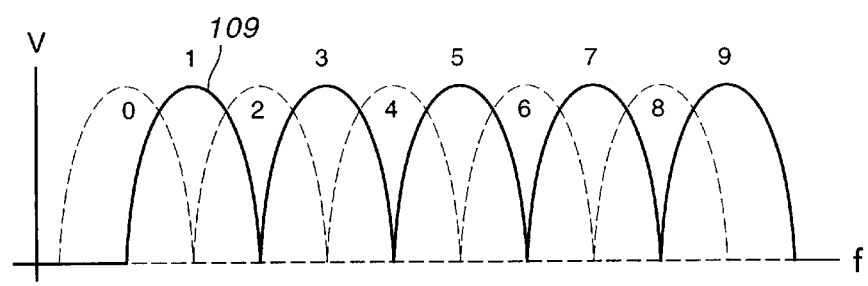
FIG. 6 illustrates the operation of FIG. 5.

The operation of telephones constructed in accordance with the invention is illustrated in FIG. 6. The center frequencies are numbered consistently with FIG. 5. In particular, curve 109 represents the frequency response of band pass filter 73 (FIG. 5). Filters 73 and 81 have the same center frequency, thereby reducing the amount of echoes or other noises between microphone 71 and speaker 89.

In a preferred embodiment of the invention, each telephone has both sets of filters. For the sake of description, the odd numbered filters in telephone 72 are referred to as group "A" and the even filters in telephone 90 are group "B."

Having both sets of filters, the telephone must decide which set to use at what time. For the sake of example, a telephone making a call operates in mode B (using the B set of filters) and a telephone receiving a call will operate initially in mode A (using the A set of filters). There are a number of possible events, the result of which could be that the telephones end a call using a different set of filters from the beginning of a call.

Figure 7:
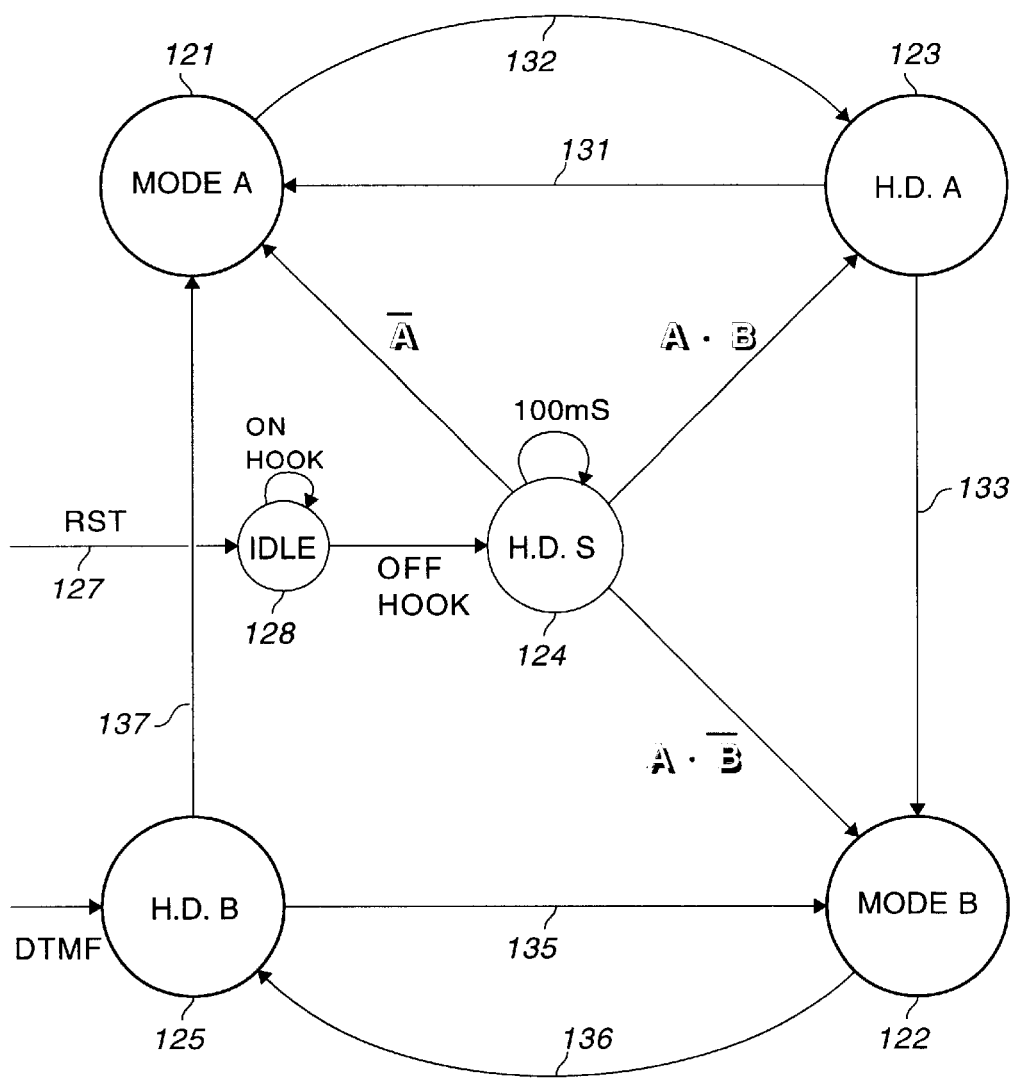
FIG. 7 is a state diagram of a telephone constructed in accordance with a preferred embodiment of the invention.

FIG. 7 is a state diagram illustrating the operation of a telephone in accordance with a preferred embodiment of the invention. Mode A (full duplex), state 121, and mode B (full duplex), state 122, have been described. There are also three half duplex states, states 123, 124, and 125. A half duplex mode becomes necessary when a telephone constructed in accordance with the invention is used for conference calls.

State 124 is temporary and a half duplex mode. All states are exited only if the conditions defining an exit path are fulfilled. State 124 is entered by receiving a telephone call. After a reset, represented by line 127, or the application of power, the telephone enters an idle state in which essentially all systems are off. Upon receipt of a telephone call, the telephone goes off hook and enters state 124. In state 124, the telephone is in half duplex mode while it looks for shadow signals indicating that there are other telephones in either A mode or B mode. If no A shadow is found, the telephone enters state 121. If the telephone finds an A shadow signal but no B shadow signal, state 122 is entered. If an A shadow signal and a B shadow signal are found, then the telephone enters state 123.

Paths 131, 132, and 133 also connect to state 123 and include different conditions that must be met before a change in state occurs. These conditions are more easily seen in conjunction with the flow chart of FIGS. 8–12.

State 125 is typically entered by placing a call. Unlike state 124, state 125 is not necessarily temporary although the most likely outcome is that state 122 will be entered shortly after completing a connection to another party. Path 135 corresponds to path 131, path 136 corresponds to path 132, and path 137 corresponds to path 133 and the paths are best understood by considering FIGS. 8–12.

FIGS. 8–12 combined are a flowchart illustrating the operation of a telephone constructed in accordance with the invention and presents in different form some of the information presented in FIG. 7. In general, it is preferred that only two people have full duplex capability in a conference call and that all others listen. If everyone should speak at once, the circuitry favors the two loudest voices, which is not necessarily preferred but the system cannot detect who ought to be heard. On the other hand, the identity of a caller can be transmitted and his telephone can be turned down by using the invention to transmit control data.

Figure 8:
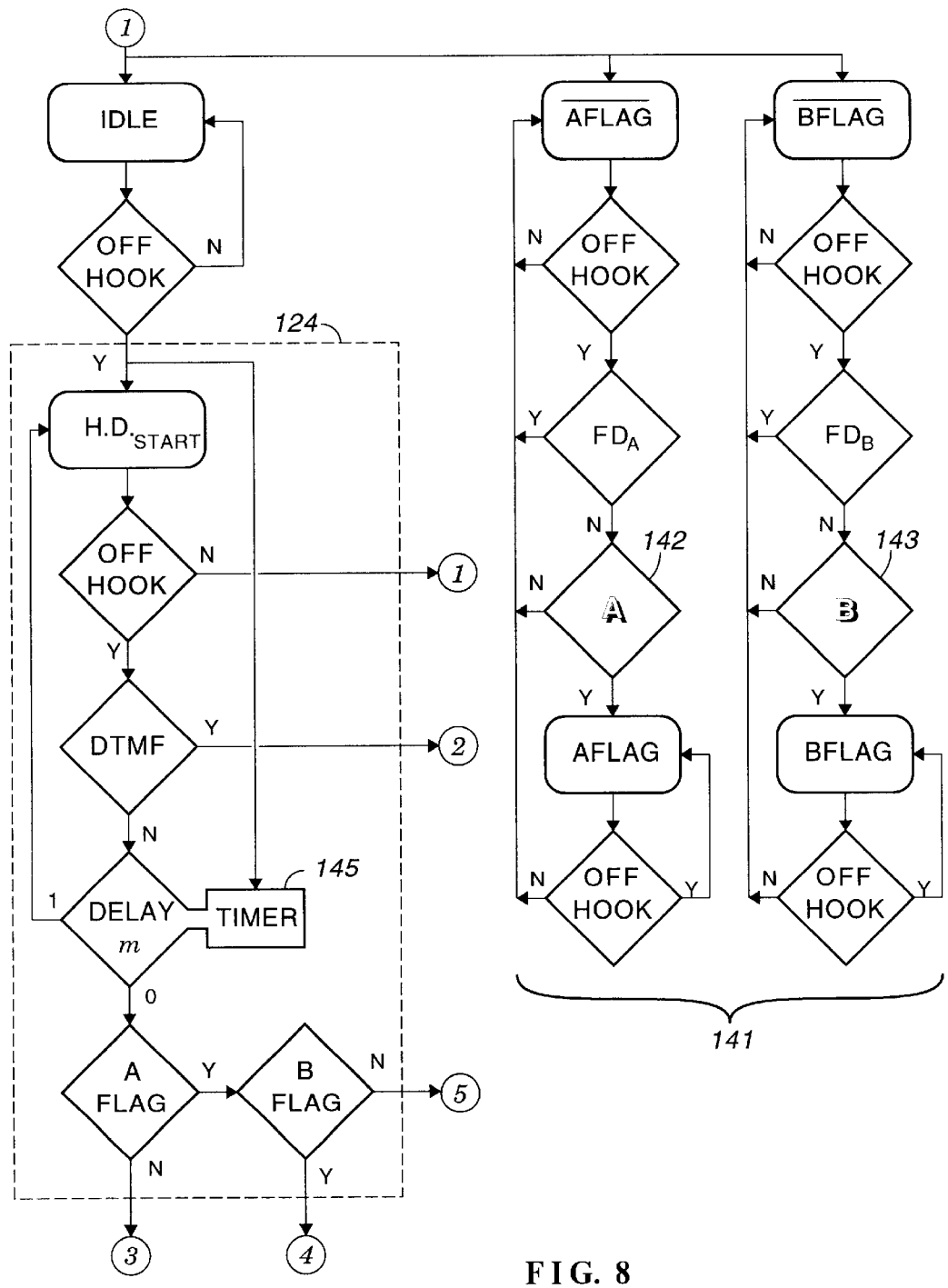
FIG. 8 is a portion of a flow chart of the initial state of a telephone constructed in accordance with a preferred embodiment of the invention.
Figure 9:
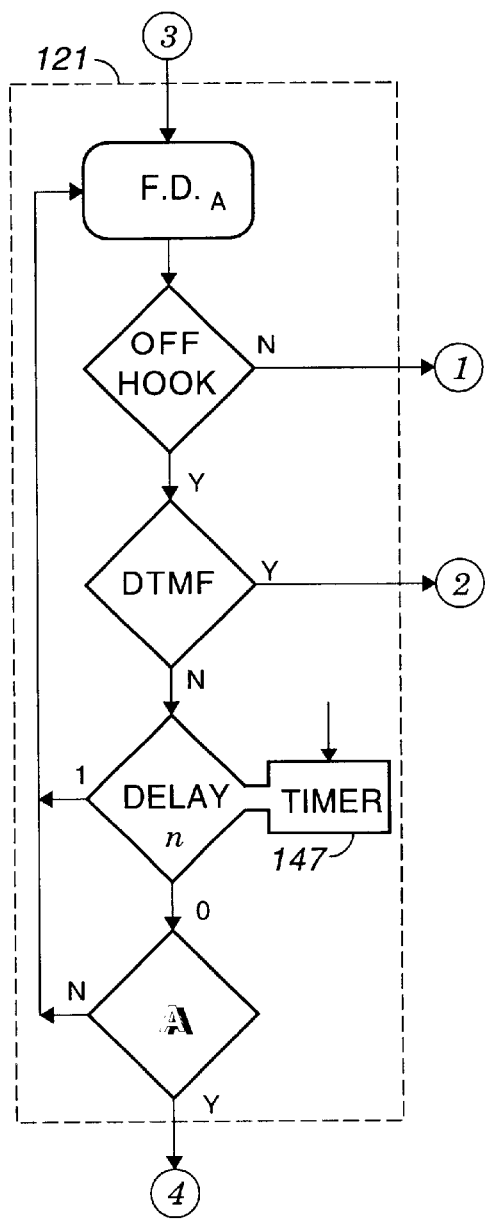
FIG. 9 is a portion of a flow chart of a full duplex state of a telephone constructed in accordance with a preferred embodiment of the invention.
Figure 10:
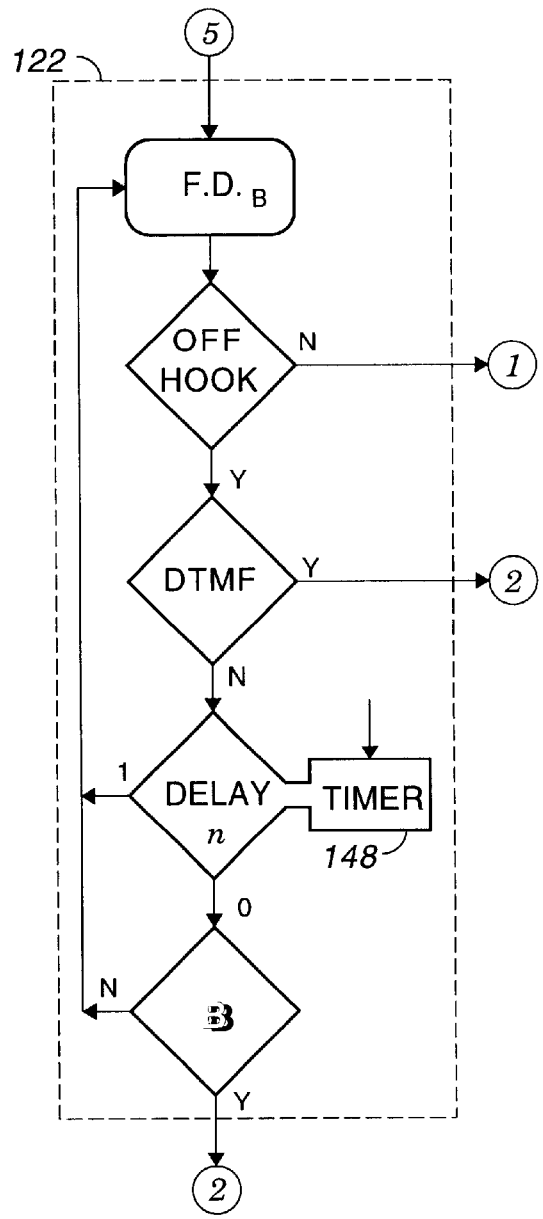
FIG. 10 is a portion of a flow chart of another full duplex state of a telephone constructed in accordance with a preferred embodiment of the invention.
Figure 11:
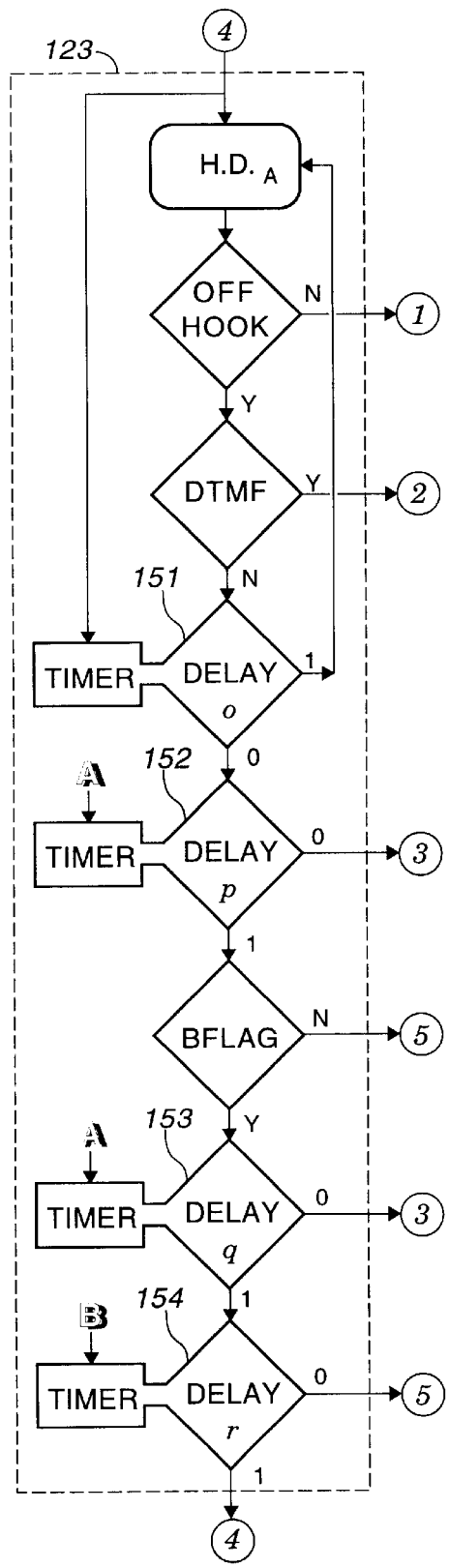
FIG. 11 is a portion of a flow chart of a half-duplex state of a telephone constructed in accordance with a preferred embodiment of the invention.
Figure 12:
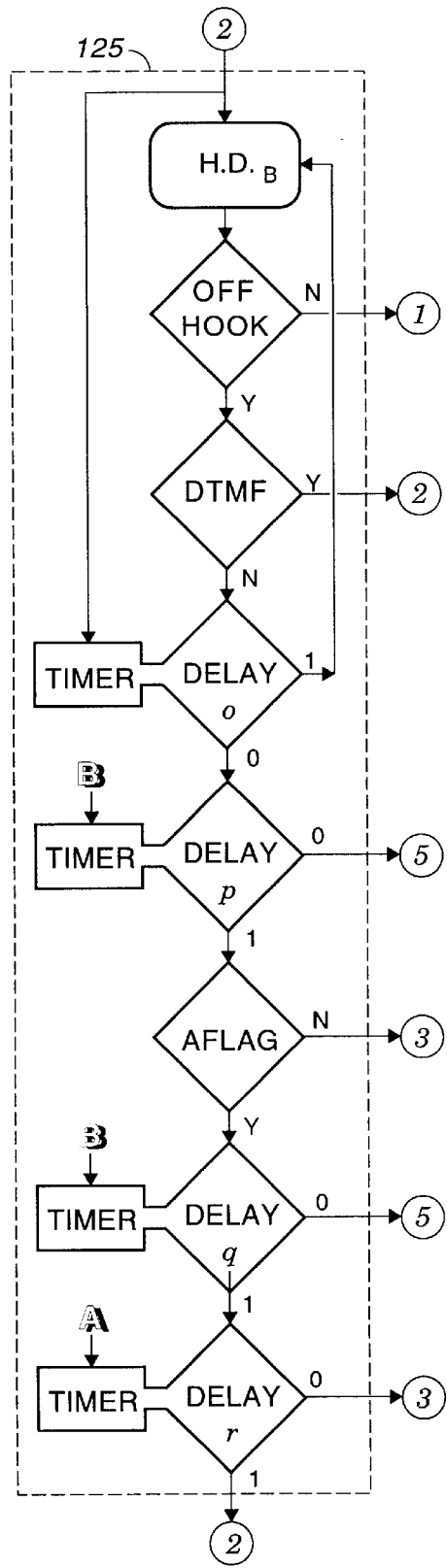
FIG. 12 is a portion of a flow chart of another half-duplex state of a telephone constructed in accordance with a preferred embodiment of the invention.

FIG. 8 is a partial flowchart illustrating initial conditions when a call is placed or received and includes state 124 (FIG. 7). FIG. 9 illustrates state 121 (FIG. 7), FIG. 10 illustrates state 122 (FIG. 7), FIG. 11 illustrates state 123 (FIG. 7), and FIG. 12 illustrates state 125 (FIG. 7). The encircled numbers in one figure are joined to like encircled numbers in the other figures or within the figure.

In general, the system spends its time in a particular state determining whether or not another state should be entered. Certain timers provide a "use it or lose it" characteristic to the full duplex mode, which the system assigns to the two parties speaking the most often. The particular delays chosen for delays m, n, o, p, q, and r are believed to provide a smooth transition from state to state but other specific delays could be used instead. In one embodiment of the invention, delay m=n=200 msec, delay o=p=10 seconds, delay q=r=500 msec.

In FIG. 8, the steps indicated by bracket 141 relate to parallel hardware. Upon reset, the A flag is cleared and, in block 142, a test is made to see if an A shadow has been detected (an output from flip-flop 56 in FIG. 4). If so, the A flag is set and remains set for as long as the telephone remains off-hook. The A flag answers the question "Was there ever an A shadow?". Similarly, block 143 tests to see if a B shadow has been detected (an output from flip-flop 57 in FIG. 4).

In the flow chart, one may see a test for an A flag or an A shadow (or B flag or B shadow). The difference is that the flag says whether or not there was ever an A shadow whereas the A shadow test says whether an A shadow exists at the time of the test.

In the flow chart, all states test for whether or not the telephone is off-hook. If not, the telephone returns to idle or off. If so, the process continues. All states then test for DTMF. If so, then a call is being made and the process immediately enters the half-duplex B mode, state 125 (FIGS. 7 and 12). If no DTMF, then a call is being received. Timer 145 causes the tests to be repeated for a predetermined length of time after the user picks up the receiver. After timer 145 times out, the telephone tests to find the correct next state, which is one of states 121, 122, and 123 (FIG. 4). The tests for choosing a state was explained in connection with FIG. 7.

FIG. 9 illustrates the steps taken in state 121, also referred to as full duplex A mode because the telephone will produce shadow A on the line output. The tests for off-hook and DTMF were described above and need not be described again. Timer 147 establishes the maximum quiet period before another telephone can take over the full duplex A mode. When the output of the timer goes low, the circuit looks for an A shadow, an output from flip-flop 56 (FIG. 4). The test is momentary and, if no A shadow is found, the machine re-enters state 121. If an A shadow is found, the system enters state 123 (FIG. 11).

FIG. 10 illustrates the steps taken in state 122, which is the same as state 121 except that the entry point and exit point are different and the test is for a B shadow. Timer 148 produces the same delay as timer 147 (FIG. 9) but it is not necessary that the two be equal.

FIG. 11 illustrates the steps taken in state 123, also referred to as half-duplex A mode because the telephone favors return to full duplex A mode over initializing full duplex B mode and because the user can either talk or listen, not both. Timer 151 is triggered by entering state 123 and holds the system in the state for a minimum period, regardless of other events, except DTMF and off-hook.

Timer 152 is triggered by an A shadow. If the timer has run out, the system is sent back to full duplex A mode (state 121, FIG. 9). Otherwise the B flag is checked. The logic thus far says that if A has not been used in the last p seconds, take over full duplex. Failing that, if B full duplex has never been used, take it.

If the B flag is set, i.e. a B shadow has been detected at any point after the telephone is off-hook, then there are two more, slightly easier tests to get into a full duplex state. Timer 153 is triggered by an A shadow and counts down for a shorter period than timer 152. Similarly, timer 154 is triggered by a B shadow and counts down for a shorter period than timer 152. If timer 153 has timed out, then full duplex A mode is entered. If not, then full duplex B mode is entered, even though the flag was set, because there has not been a B shadow in the last little while. If neither of these, then state 123 is re-entered and the process is repeated.

FIG. 12 illustrates state 125, which is similar to state 123. Modes A and B are reversed.

Figure 13:
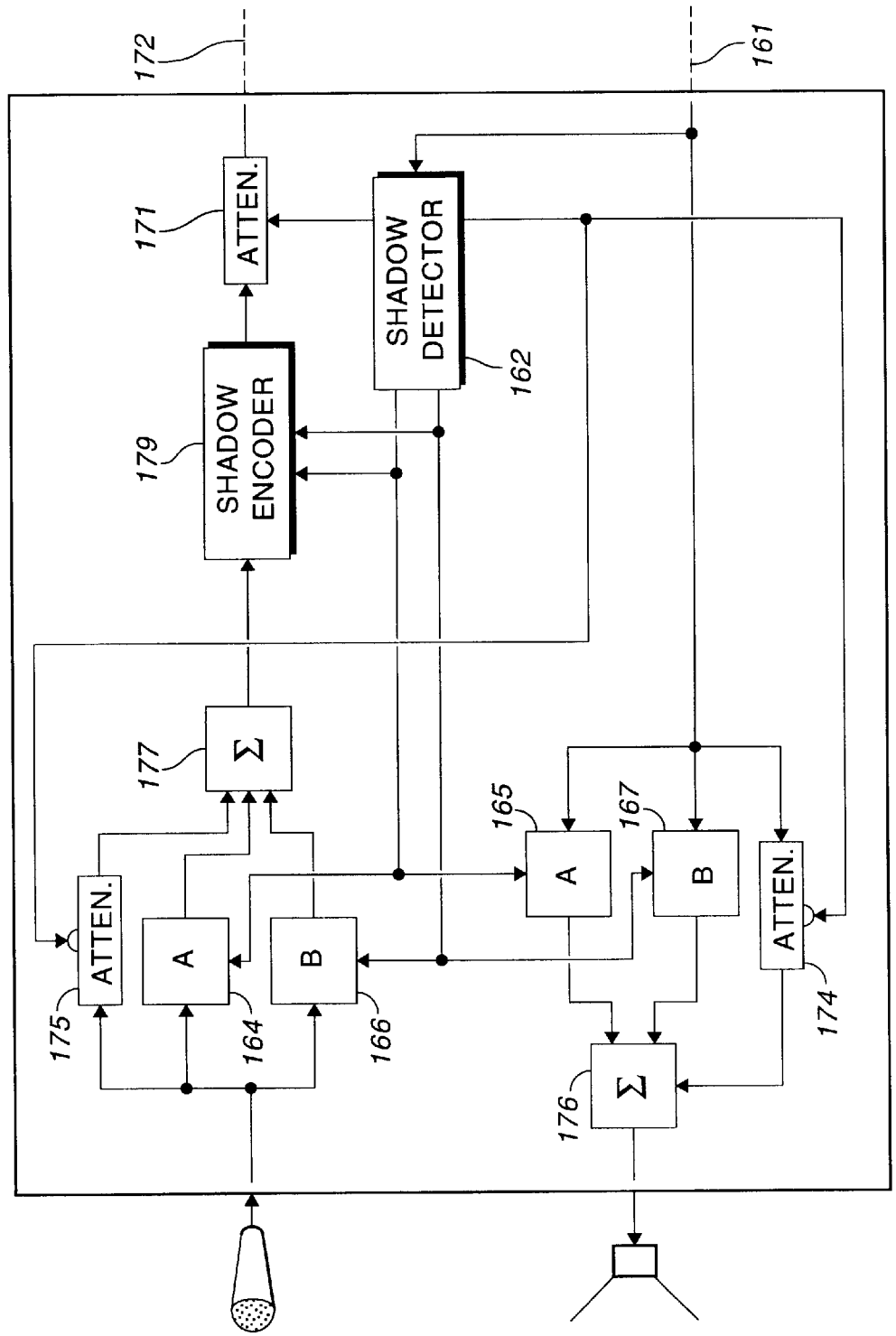
FIG. 13 is a block diagram of a telephone constructed in accordance with a preferred embodiment of the invention.

FIG. 13 is a block diagram illustrating the portions of the circuit in a telephone that relate to the state diagram of FIG. 7 and the flow chart of FIGS. 8–12. Line input 161 is monitored by shadow detector 162. If, as described above, the A filters should be used, then an enable signal is sent to filters 164 and 165. If the B filters should be used, then an enable signal is sent to filters 166 and 167.

If either set of filters is enabled, then a signal is sent to attenuator 171, opening the attenuator and allowing signals to pass to line output 172 unattenuated. If either set of filters is enabled, then a signal is sent to attenuators 174 and 175, enabling the attenuators and preventing signals on line input 161 from reaching summation circuit 176 or a signal from the microphone to reach summation circuit 177. If neither set of filters is enabled, i.e. the telephone is in a half duplex mode, then the control signals to the attenuators are reversed. Specifically, attenuator 171 is enabled (no output) and attenuators 174 and 175 are opened (filters are bypassed).

A summation circuit provides a convenient means for combining the signals from the filter sets and the attenuator. A switch controlled by shadow detector 162 could be used instead, on the inputs or on the outputs to the filter sets, or both, but this is a more complicated circuit, even though attenuators 174 and 175 could be eliminated by the switches.

Shadow encoder 179 operates as described in connection with FIG. 1 or FIG. 2; i.e. a separate delay line for each shadow or a single delay line with taps for each shadow, can be used. Control signals from shadow detector 162 select the appropriate delay.

As described thus far, the amplitude of a shadow is the same, or nearly the same, as the amplitude of the original signal. This is not a requirement of the invention. On the contrary, instead of using more than one delay and creating several shadows, one can use more than one amplitude to create several shadows.

In FIG. 4, the value in accumulator 53 is linearly proportional to amplitude. Adding second register 181 and second adder 182 enables one to check the incoming signal for two shadows of different amplitude but the same delay. For example, if the count in register 181 is half the count in register 58, then adder 182 will reach zero sooner than adder 61. When the output from adder 182 goes low, flip-flop 185 is set, producing a signal indicating a "little A" shadow. When the output of adder 61 goes low, flip-flop 56 is set, producing an output signal indicating that a "big A" shadow was detected. The output from flip-flop 56 is coupled to an input to NOR gate 183 to prevent both outputs from being high at the same time.

The invention thus provides an apparatus and method for communicating data, including control signals, unobtrusively within the voice band over a telephone line during a conversation. The transmissions are simultaneous with voice signals, i.e. without multiplexing voice and data. Among many possible uses for the invention, one can control complementary comb filters or the gain of an amplifier in a telephone during a telephone conversation. Data can be encoded as amplitude variations in the shadow, delay variations in the shadow or both. Separate data streams can be sent simultaneously by encoding one as variations in amplitude and encoding another as variations in delay.

Having thus described the invention, it will be apparent to those of skill in the art that many modification s can be made with the scope of the invention. For example, although described in terms of a telephone system, the invention can be used anywhere one wants to send data with an audio signal. The shadow can be removed or left, as desired, in the signal sent to the speaker in the telephone.

What is claimed as the invention is:

1. A method for transferring data within the voice band over a telephone line during a conversation, said method comprising the steps of:

delaying a voice signal less than fifty milliseconds to produce a shadow signal; and combining the shadow signal with the voice signal;

wherein the delay represents the data to be transferred.

2. The method as set forth in claim 1 wherein the presence or absence of a shadow signal represents data.

3. The method as set forth in claim 1 wherein at least two shadow signals are produced and the data is represented by two of the shadow signals.

4. The method as set forth in claim 3 wherein the shadow signals differ from one another by at least six percent in delay.

5. A method for transferring data within the voice band over a telephone line during a conversation, said method comprising the steps of:

delaying a voice signal less than fifth milliseconds to produce a shadow signal; and combining the shadow signal with the voice signal;

wherein the amplitude of the shadow represents the data to be transferred.

* * * * *